Feb. 27, 1940. H. L. DUNCAN 2,191,459
CONTROL MECHANISM FOR INTERNAL COMBUSTION ENGINES
Filed March 17, 1939  3 Sheets-Sheet 2
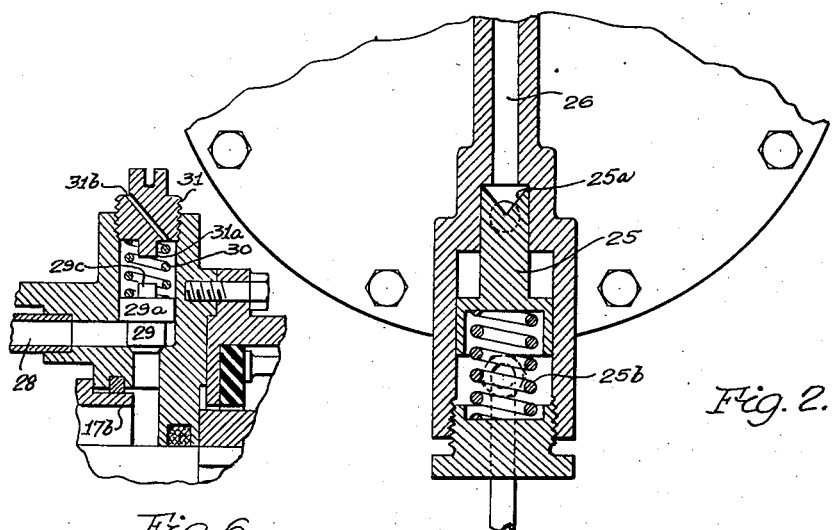
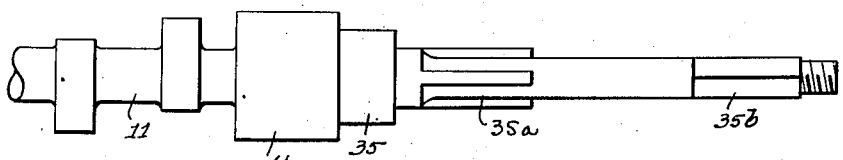
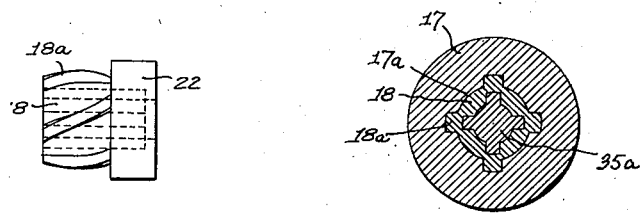
Inventor
Herbert L. Duncan,
By
Attorneys Feb. 27, 1940.  H. L. DUNCAN  2,191,459
CONTROL MECHANISM FOR INTERNAL COMBUSTION ENGINES
Filed March 17, 1939   3 Sheets-Sheet 3

Inventor
Herbert L. Duncan,
By
Attorneys

Patented Feb. 27, 1940

2,191,459

UNITED STATES PATENT OFFICE 2,191,459

CONTROL MECHANISM FOR INTERNAL COMBUSTION ENGINES

Herbert L. Duncan, Highland Park, Mich., assignor of one-half to Lewis P. Threlkeld, Detroit, Mich.

Application March 17, 1939, Serial No. 262,465

13 Claims. (Cl. 123—90)

This invention relates to improvements in control mechanism for internal combustion engines, and pertains more particularly to mechanism for controlling the timing activities, such, for instance, as the timing of the admission of charges to the engine cylinders, the firing of such charges, and the exhaust.

In an application filed by me August 17, 1937, Serial No. 159,555, allowed August 26, 1938, a modified development of a valve control mechanism is presented, this development being designed mainly to operate by means of a hydraulic or hydrostatic agency for controlling the shifting mechanism, the oil content of the sump being utilized through a pump driven from the crank shaft and thus providing an oil supply responsive to the crank-shaft speed; this supply is utilized directly to vary the position of the shiftable mechanism, and thus affect timing a brake control means being utilized to control the discharge of the oil from the cylinder and thus further modify the position of the shiftable mechanism normally provided by the speed component. The action of this modifying control means is dependent upon the degree of vacuum in the manifold.

The structure thus referred to was developed primarily for heavy duty service such as trucks, etc., where the need for speed change conditions and the change speed gearing was frequently rendered active to meet service conditions, so that needs for acceleration and deceleration were not only more frequent but were suddenly produced, and required immediate responsive action. The mechanism was required to meet conditions such as this and, during operation, and, as a result, certain other conditions were necessarily affected to compensate. Amongst these, for instance, are the conditions at starting or idling or low speeds, the need for meeting the actual service conditions placing the timing as advanced an excess distance than would be required to meet starting and low speed conditions alone; again, at extremely high speeds, the timing was retarded excessively to meet the most favorable conditions; as these were at the extremes of the engine operation range, the sacrifices made were not materially detrimental, since the engine operation and timing was made practically perfect during the normal driving activities of the truck.

With lighter service, such as light road vehicles, passenger cars, or aeroplane service or for boat service, the conditions within the intermediate range are not as severe, since speed changes are generally by throttle movements alone so that the complications presented by changing gears is not frequent. As a result, it is possible to simplify the mechanism and in such way that it is possible to reach to the range extremes referred to and to bring these to approximately the conditions of timing normal to such operation. This simplified arrangement forms the basis of the present invention, and by it the control mechanism is made operative in such manner that the "power curve" of the engine again passes to a straight line characteristic, so that it is now possible, under automatic control, to have the straight line characteristic to represent the "power line" of the engine.

The difference will be understood by considering the effects above set forth. For instance, with the timing advanced excessively at starting and at low speeds, the inlet and outlet of the charges are operated too early for this speed; by delaying the timing at this time, the cylinder conditions become normal for the speed, and proper compression action is had; in addition, the value of the depression within the intake manifold is affected through closing the intake too early. Again, with excessive retarding at extremely high speed, the inlet valve is opening too late for the speed of the engine so that compression is affected.

The present invention changes these conditions by varying the opening and closing of the inlet of the charges in such manner as to obtain proper suction and compression values as well as uniform combustion at all speeds of the engine, and in this way maintain compression values of maximum efficiency at all speeds. As a result, the maximum torque pounds per foot is made maximum at all speeds, a condition which straightens out the torque curve of the engine, obtains maximum efficiency from the fuel employed, and in addition makes possible the operation of the vehicle at starting or low speed without requiring reduction of gears.

To these and other ends, the nature of which will be more clearly understood as the invention is hereinafter disclosed, said invention consists in the improved constructions and combinations of parts hereinafter more particularly described, illustrated in the accompanying drawings, and more particularly pointed out in the appended claims.

In the accompanying drawings, in which similar reference characters indicate similar parts in each of the views, Figure 1 is a vertical section of a portion of an internal combustion engine with the present invention applied and in which parts of the latter are shown in section;

Fig. 2 is a fragmentary sectional view taken on the line 2—2 of Fig. 1 with the secton taken at right angles to the plane of the section of Fig. 1;

Fig. 3 is an elevation of an end zone of the cam shaft;

Fig. 4 is an elevation of the slidable timing control element;

Figure 7:
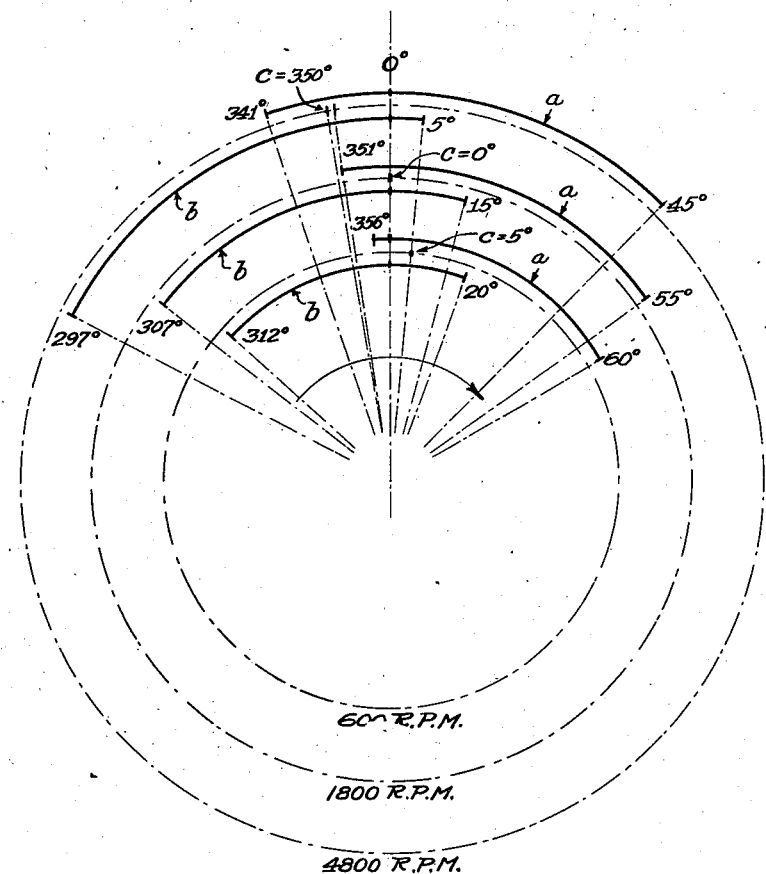
Figure 1:
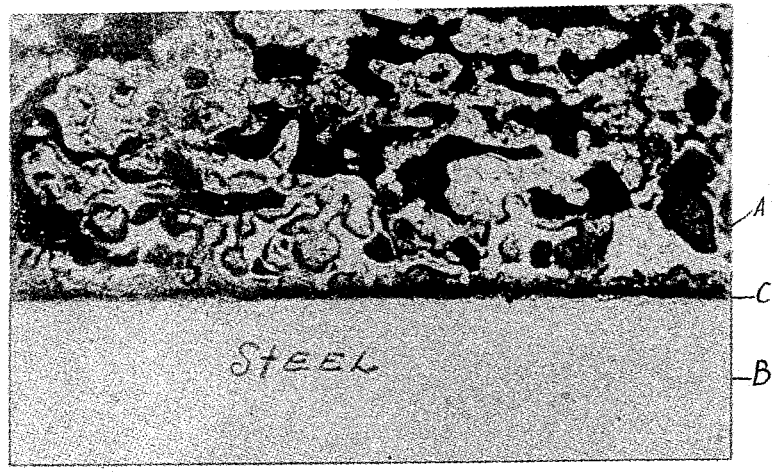

co-operate with a seat and which, when closed, closes the outlet to the channel—as indicated in Fig. 6. Valve 29 is actuated by spring 30 which retains the valve closed when the engine is idle. When the pump becomes active the pressure developed in channel 26 lifts the valve and thus provides an outlet from the channel for the oil. A threaded element 31 forms the support for the spring. Element 31 is adapted to be connected with a suitable manipulator (not shown) carried on the dash board by means of a flexible shaft 32, thus permitting the tension of the spring to be adjusted manually. To prevent the development of pressure or depression conditions such as would affect the movement of piston 29a, element 31 is provided with a vent 31b.

In practice, the resistance values of springs 19 and 30 are such that the pressure developed in channel 26 by the entering oil will be applied to both the piston 22 and the valve 29 causing the latter to move from its seat and permitting a portion of the oil to escape and return to the sump. Hence, the total volume of oil entering channel 25 is not active as a pressure source for piston 22, since only a percentage portion thereof remains within the column provided by the channel, the percentage being controlled by the position of valve 29. When the volume introduced to the channel is increased, as by an increase in the speed of the crank shaft, the additional pressure produced is not only active on the piston but also on the valve, with the result that the area of the outlet is increased, so that a percentage of the increased volume alone becomes active as a power source for the piston. Hence, the two springs co-operate in producing a percentage value of the oil active in determining the position of piston 22, this value being maintained when the engine is operating at constant speed, and being practically maintained as increasing speed increases the volume of oil being passed to the column. As a result, the valve and piston positions will change when the crank-shaft speeds are changed, but will quickly reach stable positions when the operating conditions remain constant, thus leaving member 18 in its proper position to give the desired timing of the camshaft for the particular speed attained.

When, therefore, the engine is cranked, the pump begins to operate, but inasmuch as valve 25 is in its inner position under the action of its spring, the volume entering the channel is small per unit of time, any excess provided by pumping escaping through relief valve 27. Since the oil is incompressible, the increase in volume in channel 26 produces a pressure value opposing that of springs 19 and 30. As the volume in the channel increases, this pressure will be effective to shift piston 22 and open valve 29, and thus open a relief, the dimensions of which will depend upon the resistance of spring 30. This opening of valve 29 changes the channel from the completely closed condition present when the engine is idle, a condition in which there is an outlet to the channel beyond the location of piston 22. Since the resistance of a spring increases with its compression, opening of valve 29 causes the resistance value of the two springs to be placed in substantial balance, with the channel becoming operative on the basis of a percentage relief. When this condition is established in starting, the control mechanism will then continue to operate on the basis of the percentage relief, under which conditions, the pressure in the column will be equally effective on both the valve and piston 22.

In practice, this change in the status of the column of oil from the completely closed to the partially-relieved status, will take place during starting, so that during the earlier stage of speed development, a portion of the speed component is lost during the transition period, but by the time the speed reaches the idling rate—indicated as 600 R. P. M.—the transition will have become complete, and thereafter the operation of the mechanism is based upon the percentage relief condition, with piston 22 so positioned as to locate the timing activities at the locations indicated in the diagram of Figure 7 applying to the 600 R. P. M. speed.

When the speed is to be increased, the throttle is opened to the desired extent, thus disturbing the previous relationship between the pressure values on opposite sides of the throttle, by increasing the supply through the throttle, tending to momentarily relatively flood the manifold and decrease the depression value therein. This provides a greater differential between the pressures in the manifold and cylinder when the intake valve is opened, and increases the volume admitted to the cylinder; the change in depression value is also effective at valve 25 which tends to momentarily move in the direction of its closed position, thus affecting the supply of oil to the column, so that there is a tendency for a momentary backward movement of piston 22 to retard the timing. With the increase in the charge volume in the cylinder, the power value is increased, to thereby increase the piston speed and resultant increase in crank-shaft speed, to cause an increase in the volume of oil delivered by the pump. The increase in piston speed in turn serves to again set up the differential in pressure status between the intake manifold and the valve-open cylinder, thus increasing the depression value in the manifold to provide the pressure effective to again open valve 25.

Several characteristic changes occur during the transition period. In the intake manifold, the accession of fuel from the supply initially decreases the depression value and increases the volume of fuel which can be supplied per unit of time past the throttle; as the increased supply attempts to equalize pressures in the manifold and the valve-open cylinder, a large volume passes into the cylinder in the form of the charge, with the resultant increase in power value when the charge is fired, and the succeeding increase in piston speed and stepping up the speed of the crank-shaft; as the succeeding valve-open periods follow, the depression value in the intake manifold again increases to that which provides the proper action at the new speed. At valve 25, the initial response to the change in depression value, is a movement of the valve in the closing direction with resultant decrease in the area of the port; since the volume delivered by the pump is unchanged at this time, a tendency to build up pressure in advance of the port is met by activity of the relief valve 27, and a possible small augmenting of the speed of the oil through the port; as the crank-shaft speed increases the pump volume is increased, increasing the pressure in advance of the valve; as the depression value in the intake manifold increases to its running value, the valve is again moved in its valve-open direction, permitting an increased flow, and at the speed which is the running velocity of the oil at the particular speed. In the channel 26 including the zone of piston 22, the initial movement of valve 25 tends to reduce the supply of oil per unit of time, thus reducing the pressure within the column with its tendency of permitting valve 29 and piston 22 to move in the returning direction seeking to establish equilibrium; as the pressure increases through increase in pump speed and movement of valve 25 in its opening direction, the pressure in the column is again increased, and as equilibrium becomes established, the piston 22 will have been advanced to the position it occupies at the selected speed, with valve 29 providing the proper open position to set up the desired percentage of the volume of oil admitted that is to be active in the column for maintaining the position of piston 22. At the close of the transition period, the fuel supply is that required for the selected speed, the engine will be operating at such selected speed, and the timing activities will take place with the valve movements and the sparking timed to accord with the new speed conditions; if the speed increase is 300 R. P. M., for instance, the timing will have advanced one degree relative to the positions present prior to the beginning of the transition period—if the speed increase is 600 R. P. M., the advance will be two degrees, etc.

Hence, the timing of the engine will be automatically responsive to the particular conditions that may be present at any moment while the engine is in operation, with the timing following the relationships indicated in the diagram of Fig. 7. At the instant of major throttle change a major effect is set up which requires compensating adjustments as to timing, but the mechanism rapidly produces these adjustments, so that there is no material delay in responsiveness to change present in the engine operation. In fact, the action is such that although the change becomes effective practically instantaneously, the compensation action has actually included a number of successive actions with these tending to produce a gradual change effect instead of a sudden effect, with the result that the change is itself a smooth development such as eliminates the need for any special damping mechanism in the control mechanism.

If abnormal operating conditions are encountered temporarily, such, for instance as would set up "knock" conditions under normal operation, the manual control through element 31 will enable the normal operation to be temporarily changed to meet the abnormal conditions, without requiring any action other than adjustment of member 31, followed by a return of the latter to the normal position when the abnormal conditions have ended. At all times the compression values in the cylinder are at a maximum and best suited to provide the maximum power value that is desired for the instant speed conditions. And the engine will operate at equal efficiency at all speeds, with the timing at idling speed properly retarded, and at maximum speed properly advanced, to produce the straight line power value effect which forms one of the underlying advantages that the present invention is designed to produce.

While I have herein shown and described a preferred form of mechanism for producing the desired effects, it will be readily understood that changes and modifications therein may be found necessary or desirable to meet the exigencies of use, engine construction, etc., or the preferences of individual engine manufacturers, and I desire to be understood as reserving the right to make any and all such changes or modifications as may be found necessary or essential, insofar as the same may fall within the spirit and scope of the invention as expressed in the accompanying claims when broadly construed.

What I claim as new is:

1. As a means for controlling the timing of internal combustion engines, wherein the crank shaft and cam shaft are operatively connected in drive relation of constant ratio, and wherein the cam shaft is operative to control the timing of the intake and exhaust valves and the spark timing mechanism, means operative to vary the phase relationship of crank-shaft and cam-shaft while preserving the constant ratio drive relation, said means including an adjustable drive mechanism within the drive connections between said shafts with the mechanism adjustable to provide the variable phase relationship between the shafts, and means to produce and control the adjustments of said adjustable drive mechanism, said latter means including a fluid flow path open to said mechanism and having its outlet beyond such mechanism, and means for supplying fluid to said flow path responsive to crank shaft speed with the supply variable as to volume active therein per unit of time by variations in depression values within the intake manifold of the engine.

2. Timing control means as in claim 1 characterized in that the fluid supply means includes a pump driven in synchronism with the crank-shaft, a valve within the flow-path subject to depression value control of the intake manifold, said valve being arranged for graduated portage, and relief means intermediate the pump and valve to compensate for any fluid volume variations between the volume pumped and that passing the valve per unit of time, whereby the active volume of the flow path is determined by the combined and co-operative activities of crank-shaft speed and the intake manifold depression values.

3. Timing control means as in claim 1 characterized in that the flow-path outlet is valve-controlled, with the valve spring-supported to close the outlet in the absence of supply means activity and to be opened by the activity of such supply means, whereby the position of the drive mechanism within its range of adjustment is made dependent upon the respective volumes of fluid admitted to the flow-path and discharged therefrom through such outlet.

4. Timing control means as in claim 1 characterized in that the flow-path outlet is valve-controlled, with the valve spring-supported to close the outlet in the absence of supply means activity and to be opened by the activity of such supply means, whereby the position of the drive mechanism within its range of adjustment is made dependent upon the respective volumes of fluid admitted to the flow-path and discharged therefrom through such outlet, said drive mechanism being spring-supported to oppose adjusting movements by fluid pressure to thereby limit adjusting movement of the mechanism from one extreme of the range of movement to periods when the supply volume exceeds that of the outlet per unit of time, whereby movement of the mechanism from such extreme is responsive to a percentage of the volume flowing through the fluid flow path with the percentage value increasing as the flowing volume increases per unit of time.

5. Timing control means as in claim 1 characterized in that the flow-path outlet is valve-controlled, with the valve spring-supported to close the outlet in the absence of supply means activity and to be opened by the activity of such supply means, whereby the position of the drive mechanism within its range of adjustment is made dependent upon the respective volumes of fluid admitted to the flow-path and discharged therefrom through such outlet, means being provided to manually control at will the portage value of the outlet valve when in open position to control the value of the flowing volume effective in positioning the drive mechanism intermediate the extremes of the range of movement of such mechanism.

6. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement.

7. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement, the advance control means being a valve subject to the depression value conditions within the intake manifold of the engine to thereby control the volume of fluid supplied to the controlled zone of the flow path responsive to crank-shaft speed.

8. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement, the means in succession to said mechanism being a spring-supported valve adapted to close the flow-path outlet in the absence of flowing fluid and adapted to be opened by the activity of the supply means, the resistance of the valve spring being manually controllable at will to thereby permit control of the area of the outlet.

9. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement, the independent means each including a spring supported valve with the advance valve subject to control by the depression valve conditions of the intake manifold of the engine and the outlet valve being manually controlled as to the resistance value of its spring to thereby permit control at will of the dimensions of the outlet and thereby determine the volume of fluid flow per unit of time active upon the drive mechanism.

10. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement, the advance control means being a spring-supported valve having its active face graduated to vary the volume of fluid passing the valve per unit of time, said valve being subject to the depression value conditions within the intake manifold of the engine to thereby control the position of the valve and the volume of fluid to be passed into the flow-path through the valve.

11. Timing control means as in claim 1 characterized by independent control means within the flow path and positioned respectively in advance of and in succession to the drive mechanism to thereby control the volume of fluid passing the position of the drive mechanism and effective on such mechanism to vary the position of the mechanism from one extreme of the range of mechanism movement, the advance control means being a spring-supported valve having its active face graduated to vary the volume of fluid passing the valve unit of time, said valve being subject to the depression value conditions within the intake manifold of the engine to thereby control the position of the valve and the volume of fluid to be passed into the flow-path through the valve, the graduated face of the valve having a configuration relative to the valve seat such as to prevent complete closing of the passageway through the valve, whereby the content of the flow-path is instantly responsive to supply activity in presence of crank-shaft rotation.

12. As a means for controlling the timing of internal combustion engines, wherein the crank shaft and cam shaft are operatively connected in drive relation of constant ratio, and wherein the cam shaft is operative to control the timing of the intake and exhaust valves and the spark timing mechanism, means operative to vary the phase relationship of crank-shaft and cam-shaft while preserving the constant ratio drive relation, said means including an adjustable drive mechanism within the drive connections between said shafts with the mechanism adjustable to provide the variable phase relationship between the shafts, and means to produce and control the adjustments of said adjustable drive mechanism, said latter means including speed responsive means controllable by depression value conditions in the intake manifold of the engine to position said drive mechanism within its range of adjustable movement to thereby establish a definite progression relationship between the timing activities and the speed and load conditions of the engine, and means accessible to the operator and operable at will for varying the progression relationship values during engine operation.

13. Timing control mechanism as in claim 12 characterized in that the speed responsive means includes a fluid flow path open to the drive mechanism and having its outlet beyond such mechanism with the fluid supply responsive to crank shaft speed and with the volume admitted to the flow path subject to control by the depression value conditions of the intake manifold.

HERBERT L. DUNCAN.

Feb. 27, 1940.    J. S. FISHER    2,191,460
ARTICLE OF MANUFACTURE
Filed March 28, 1936    2 Sheets-Sheet 1

Inventor
JOHN S. FISHER
Attorney